M. JACOB.
CASH AND AUTOGRAPHIC REGISTER.
APPLICATION FILED DEC. 5, 1910.
1,035,708.
Patented Aug. 13, 1912.
2 SHEETS—SHEET 1.
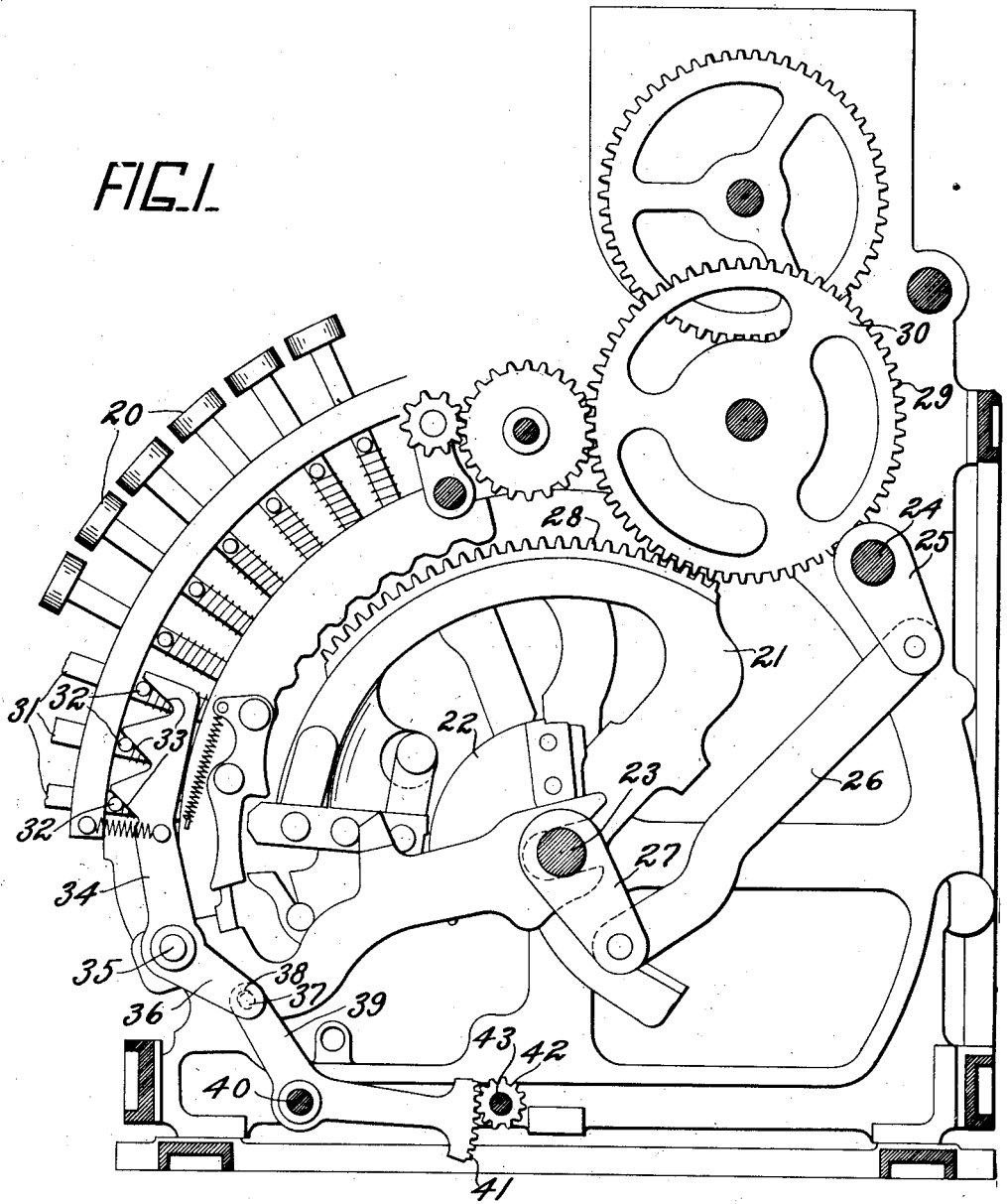

M. JACOB.
CASH AND AUTOGRAPHIC REGISTER.
APPLICATION FILED DEC. 5, 1910.
1,035,708.
Patented Aug. 13, 1912.
2 SHEETS—SHEET 2.
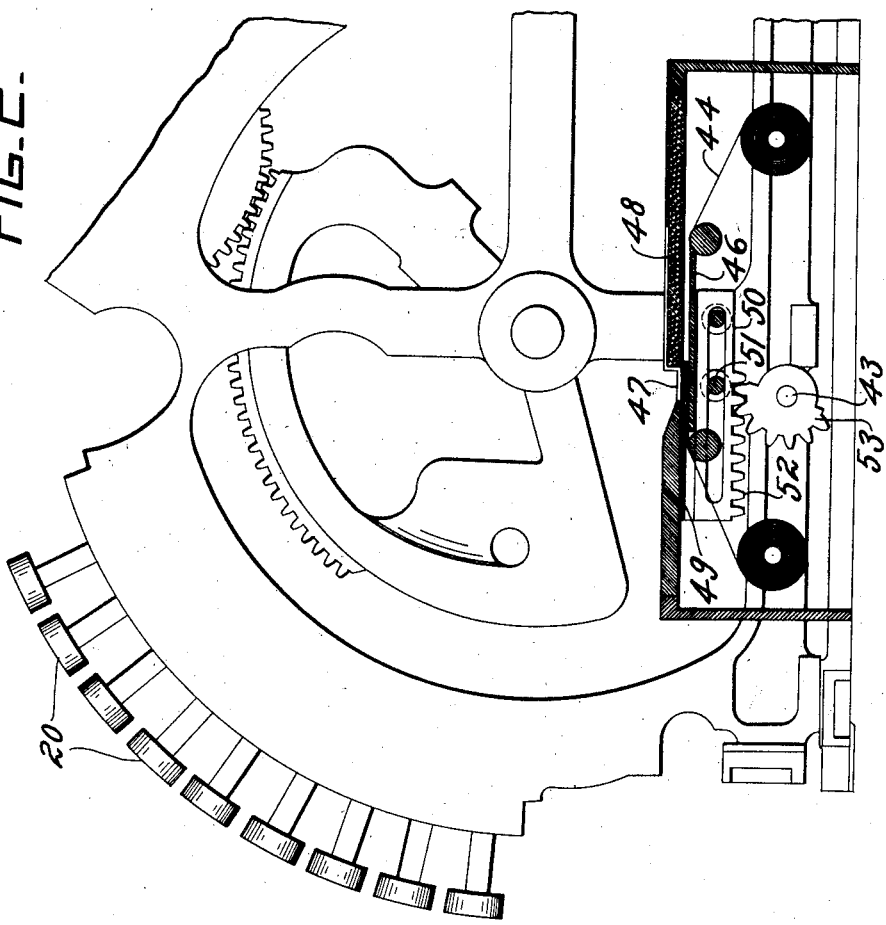
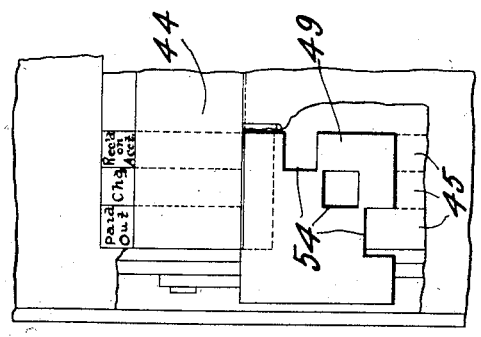

UNITED STATES PATENT OFFICE.

MAX JACOB, OF BERLIN, GERMANY, ASSIGNOR TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,035,708.  Specification of Letters Patent.  Patented Aug. 13, 1912.

Application filed December 5, 1910. Serial No. 595,550.

*To all whom it may concern:*

Be it known that I, MAX JACOB, a subject of the Emperor of Germany, residing at Berlin, in the Kingdom of Prussia and Empire of Germany, have invented certain new and useful Improvements in Cash and Autographic Registers, of which I declare the following to be a full, clear, and exact description.
This invention relates to cash registers and has more particular relation to that class of registers provided with an autographic attachment including a strip of record material adapted to receive entries of certain classes of transactions.

The improvements are, for the sake of illustration, shown as applied to a machine of the type shown and described in Letters Patent of the United States granted to Frank H. Bickford on January 7, 1902, and numbered 690,554 and to Cleal and Reinhard on April 13, 1897, and numbered 580,378 and reference may be had to the said patents for a more detailed description of a machine of that type. The machine shown in said patents is of the type known as "two-motion," that is, keys are first depressed to determine the record to be made, and the operation is finally completed by a crank or other suitable driving mechanism.

In machines of this type it is customary to provide a series of special keys, in addition to the amount keys, which special keys are used in recording transactions other than cash transactions, such, for instance, as "received on account," "charged" and "paid out." It has also been customary when such special transactions are entered in the register, to place in the cash drawer of the machine a paper check or slip bearing certain data pertaining to the transaction. With such a system there is always a possibility of one of the slips becoming lost, and the record is therefore not entirely reliable.
It has often been found desirable to provide a record of a greater degree of permanency and accuracy, and it is to the attainment of this end that the present construction has been devised.
In many well known forms of devices employing record strips the record strip is divided into columns each appropriate to a certain class of transactions. With such devices, however, it is frequently found that the operator, through error, enters an amount in a wrong column on the strip.

The object of the present invention is positively to compel the entry of each transaction in its proper column, and thus to assure a more accurate record being made.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings: Figure 1 is a cross section of a machine of the type shown in said Bickford, and Cleal and Reinhard patents with the present improvements applied thereto. Fig. 2 is an end view partly in section showing the recording device attached to a machine of the type shown in said patents. Fig. 3 is a top plan view of the adjustable concealing means for compelling an entry in the proper column of the record strip.

The operation of the machine to which the present improvements are shown as applied, is substantially the same as shown in above mentioned Letters Patent but for convenience may briefly be described as follows: The machine comprises a plurality of banks of keys 20, see Fig. 1, any one of which keys, when depressed, serves as a stop for a differentially movable rocking segment 21. Only one bank of such keys 20 is shown, however, in the present application as the several banks which generally go to make up a complete machine for practical use, are substantially duplicates in construction. The segment rack 21 receives its rocking movement from a segment 22 to which it is automatically coupled and uncoupled in a manner well known in the art and fully set forth in the above enumerated Letters Patent. Segment 22 is rigidly mounted on a rock shaft 23 to which power is transmitted from the main shaft 24 through the medium of a crank 25, pitman 26 and arm 27. Any form of power may be employed for rotating the main shaft 24, either a crank handle or motor being preferred. Segment 21 has formed thereon teeth 28 meshing with similar teeth 29 formed on an intermediate gear 30, through the medium of which gear the differential movement of the segment 21 is transmitted to the indicating and totalizing mechanisms in a manner well known in the art and needing no further description here. Only the six upper keys 20 of the bank of keys shown in Fig. 1 are amount or value keys, while the three lower keys 31 are for the purpose of recording special transactions such as "received on account," "charge" and "paid out." Each of the latter keys 31 is provided with a laterally extending pin 32 which is adapted to engage inclined portions 33 of a plate 34 pivoted at 35 to the frame of the machine. The plate 34 has a downwardly extending portion 36 carrying at its lower end a pin 37 engaging a slot 38 formed in an upwardly extending arm of a rack lever 39 pivoted at 40. At its rear end the lever 39 is formed with teeth 41 at all times engaging the teeth of a pinion 42 rigidly mounted on a rock shaft 43 extending across the lower portion of the machine.

At the right hand end of the machine there is provided an autographic attachment comprising a strip of record material 44, see Figs. 2 and 3, which record strip is divided into columns 45 each appropriated to one of the three classes of transactions above enumerated, that is, "received on account", "charge" and "paid out". Any suitable form of feeding mechanism may be provided for the record strip so as to feed the strip at each operation of the machine, or only when one of the keys 31 is depressed, but as this forms no part of the present invention no such feeding mechanism is herein shown. The record strip is adapted to pass over a writing table 46 located just beneath a writing or sight opening 47 formed in the inclosing casing. Said casing may be provided with a glass plate 48 to permit of the reading of several preceding transactions on the record strip as the same is advanced.

In order to prevent an entry on the record strip without first depressing a transaction key, and, further, to prevent any entry being made in the wrong column on the record strip, there is provided a concealing shutter mechanism 49 which normally completely conceals the record strip at the sight opening. The shutter 49 is carried by a sliding rack 50 mounted to slide on pins 51 carried by the frame of the machine. The rack 50 is provided with rack teeth 52 meshing with the teeth of a segmental gear 53 rigidly mounted on the right hand end of the aforesaid cross shaft 43. It will thus be seen that upon the depression of any one of the transaction keys 31 the plate 34 will be rocked differentially, such differential movement being transmitted to the shutter 49 through the medium of said plate 34, lever 39, pinion 42, shaft 43, segment gear 53 and rack slide 52. The shutter 49 is provided with a series of differentially located openings 54 each located directly above one of the columns 44 of the record strip 45 and adapted, when the shutter 49 is adjusted, to be brought successively into alinement with the opening 47 thereby to expose its appropriate column 44 on the record strip. It will thus be seen that, in an operation of the machine, if the upper one of the three keys 31 be depressed the plate 34 will receive its minimum degree of movement and the plate 49 will be adjusted to bring the opening 54 appropriate to the "received on account" column, beneath the opening 47. If, however, the lowermost key 31 be depressed the plate 34 will receive its maximum movement and the opening 54 appropriate to the "paid out" column of the record strip will be brought into alinement with the opening 47 thereby to expose the "paid out" column to receive a written record.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register, the combination with a series of transaction keys, of means supporting a record strip adapted to receive written entries of transactions said strip being divided into columns each appropriate to one of said keys, adjustable means normally concealing said record strip to prevent entries thereon, and means under control of said keys for differentially adjusting said concealing means to expose the column of the strip appropriate to the key operated.

2. In a cash register, the combination with a series of transaction keys, of means supporting a record strip adapted to receive written entries of transactions, a single means normally concealing said record strip and differentially adjustable relative thereto upon an operation of one of said keys to expose a portion of said strip.

3. In a cash register, the combination with means supporting a record strip adapted to receive written entries of transactions, of an inclosing casing for said device having a writing opening, means normally closing said writing opening said means comprising a differentially adjustable shutter having a series of writing openings differentially located therein and means for differentially adjusting said shutter to bring any one of said series of writing openings into alinement with the writing opening of the inclosing casing to expose a desired portion of the record strip.

In testimony whereof I affix my signature in the presence of two witnesses.

MAX JACOB.

Witnesses:
 HENRY HASPER,
 WOLDEMAR HAUPT.